(12) United States Patent
LeGrande

(10) Patent No.: US 8,755,059 B2
(45) Date of Patent: Jun. 17, 2014

(54) PORTABLE MULTIUSE PROJECTOR WITH FIBER OPTIC PROJECTION

(71) Applicant: Taishita LLC, Upper Marlboro, MD (US)

(72) Inventor: Eugene LeGrande, Upper Marlboro, MD (US)

(73) Assignee: Taishita LLC, Upper Marlboro, MD (US)

( * ) Notice: Subject to any disclaimer, the term of this patent is extended or adjusted under 35 U.S.C. 154(b) by 28 days.

(21) Appl. No.: 13/672,425

(22) Filed: Nov. 8, 2012

(65) Prior Publication Data

US 2013/0114098 A1 May 9, 2013

Related U.S. Application Data

(60) Provisional application No. 61/556,877, filed on Nov. 8, 2011.

(51) Int. Cl.
*G06F 3/12* (2006.01)
*H04N 1/46* (2006.01)
*H04N 5/64* (2006.01)
*G03B 21/14* (2006.01)

(52) U.S. Cl.
USPC ....... 358/1.13; 358/501; 358/901.1; 348/744; 348/E9.025; 353/38

(58) Field of Classification Search
None
See application file for complete search history.

(56) References Cited

U.S. PATENT DOCUMENTS

| | | | |
|---|---|---|---|
| 3,815,986 | A | 6/1974 | Darbee |
| 4,170,400 | A | 10/1979 | Bach et al. |
| 4,620,266 | A | 10/1986 | Baumann et al. |
| 4,917,487 | A | 4/1990 | Cruickshank |
| 4,978,952 | A | 12/1990 | Irwin |
| 5,031,990 | A | 7/1991 | Mori |
| 5,076,660 | A | 12/1991 | Messinger |
| 5,136,675 | A | 8/1992 | Hodson |
| 5,150,443 | A | 9/1992 | Wijnberg |
| 5,165,187 | A | 11/1992 | Shahidi-Hamedani et al. |
| 5,208,891 | A | 5/1993 | Prysner |
| 5,323,477 | A | 6/1994 | Lebby et al. |
| 5,594,253 | A | 1/1997 | Bueno |
| 5,636,299 | A | 6/1997 | Bueno |
| 5,951,136 | A | 9/1999 | Furuhata |
| 6,375,330 | B1 | 4/2002 | Mihalakis |
| 6,386,711 | B1 | 5/2002 | Petruchik et al. |
| 6,480,634 | B1 | 11/2002 | Corrigan |

(Continued)

FOREIGN PATENT DOCUMENTS

| | | |
|---|---|---|
| GB | 2073905 A | 10/1981 |
| WO | WO2009142503 A1 | 11/2009 |
| WO | WO2010110667 A1 | 9/2010 |
| WO | PCT/US12/64044 | 11/2012 |

*Primary Examiner* — Thomas Lett
(74) *Attorney, Agent, or Firm* — Mary B. Tung; Davis, Agnor, Rapaport & Skalny, LLC

(57) ABSTRACT

A portable multiuse projector is described. The device includes a fiber-optic projection system which allows the portable multiuse projector to have the capability to copy, scan, print and fax. A personal computer or laptop input allows for presentations, copy, scan, print and fax functions from the convenience of a laptop anywhere and anytime. Moreover, the multiuse projector of the invention is supplied with USB and other ports to accommodate tablet or electronic book presentations, external hard drive and/or mouse or input device usage.

10 Claims, 13 Drawing Sheets

(56) References Cited

U.S. PATENT DOCUMENTS

| | | |
|---|---|---|
| 6,626,543 B2 | 9/2003 | Derryberry |
| 6,718,103 B2 | 4/2004 | Cruz |
| 7,075,685 B2 | 7/2006 | Chen |
| 7,134,756 B2 | 11/2006 | Drucker |
| 7,140,731 B2 | 11/2006 | Olson |
| 7,301,664 B2 * | 11/2007 | Freeny et al. ............... 358/1.15 |
| 7,314,281 B2 | 1/2008 | Katase |
| 7,396,137 B2 | 7/2008 | Lim |
| 7,585,077 B2 | 9/2009 | Zakoji |
| 7,717,571 B2 | 5/2010 | Lee |
| 7,771,057 B2 | 8/2010 | Combs |
| 7,896,503 B2 | 3/2011 | Woo |
| 7,959,305 B2 | 6/2011 | Destain |
| 7,967,454 B2 | 6/2011 | Hirabayashi |
| 8,061,856 B2 | 11/2011 | Shirai |
| 8,070,297 B2 | 12/2011 | Kamijima |
| 8,107,018 B2 | 1/2012 | Han |
| 8,128,238 B2 | 3/2012 | Fujita |
| 8,267,532 B2 | 9/2012 | Khechana |
| 2002/0054415 A1 | 5/2002 | Lee |
| 2003/0128341 A1 * | 7/2003 | Li ................................. 353/53 |
| 2003/0142040 A1 * | 7/2003 | Gaydoul et al. ................ 345/4 |
| 2004/0095562 A1 | 5/2004 | Moffatt |
| 2005/0220467 A1 | 10/2005 | Takahashi |
| 2009/0115852 A1 | 5/2009 | Jung |
| 2010/0118327 A1 * | 5/2010 | Caspar et al. ............... 358/1.13 |
| 2010/0328700 A1 | 12/2010 | Osada |
| 2011/0038006 A1 | 2/2011 | Sato |
| 2011/0285875 A1 | 11/2011 | Yakel |
| 2012/0182416 A1 | 7/2012 | Kawaguchi |

* cited by examiner

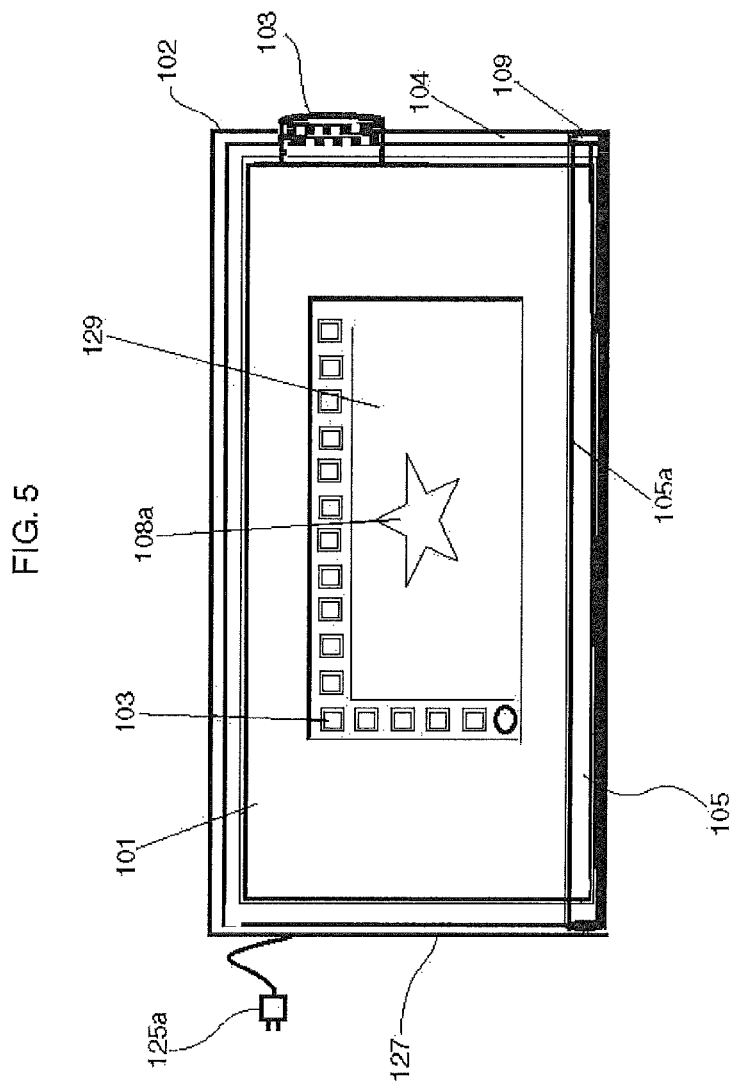

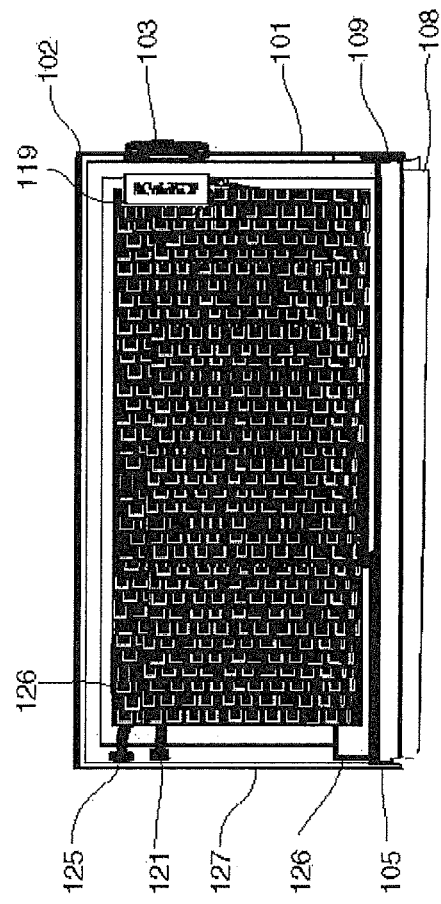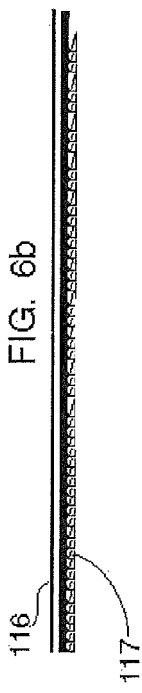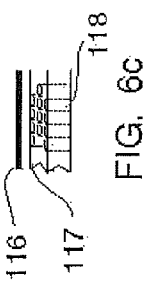

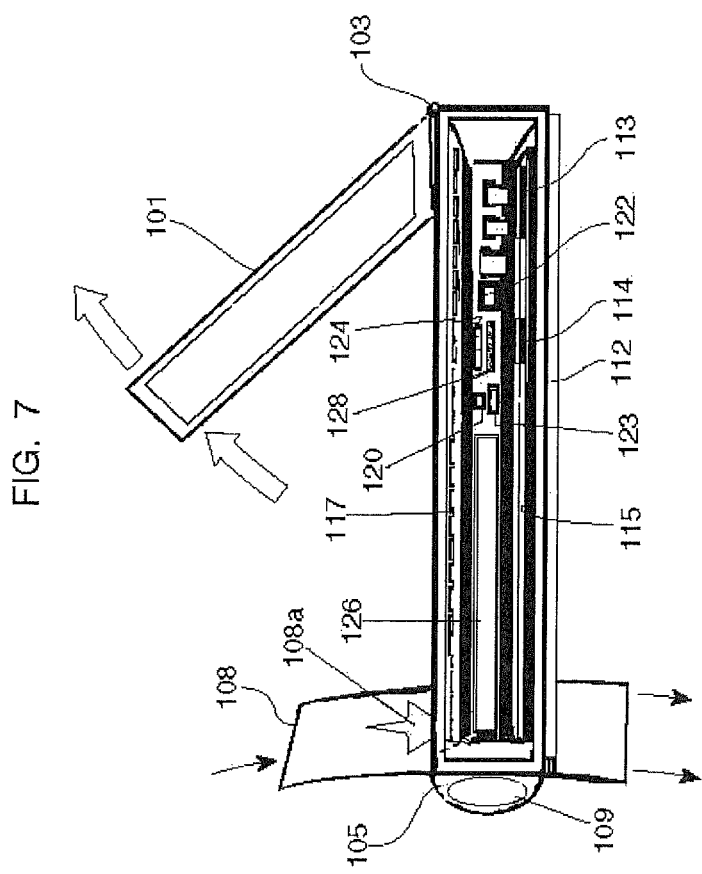

PORTABLE MULTIUSE PROJECTOR WITH FIBER OPTIC PROJECTION

CROSS REFERENCE TO RELATED APPLICATIONS

This application claims priority to U.S. Provisional Application No. 61/556,877, filed Nov. 7, 2012.

BACKGROUND

1. Field of the Invention

This invention relates to a portable projector apparatus which can be used as a peripheral device and as a multifunctional scanner, copier, printer and facsimile device with personal computer or PC operating system and internet/Wi-Fi capabilities.

2. Background of the Invention

More companies seek efficiency products and small businesses are seeking cost-effective ways to minimize costs. Projectors used to generate enlarged images from software, or computer-generated images are known, such as those shown in U.S. Pat. No. 5,951,136 (Furuhata, et al), U.S. Pat. No. 7,396,137 B2 (Lim), and U.S. Pat. No. 7,896,503 B2 (Woo). Electronic image projection devices, such as those described in U.S. Pat. No. 6,626,543 (Derryberry), a unit with a built in display component, U.S. Pat. No. 7,771,057 B2 (Combs, et al.), or with scanning capabilities, U.S. Pat. No. 7,075,685 B2 (Chen et al.) are also known. Mobile products with multi-use features that allow employees to stay on the road to increase company productivity are needed as the competition in business grows.

SUMMARY OF THE INVENTION

The present invention is drawn to a portable multiuse projector. The projector uses a fiber optic imaging apparatus, which allows the portable multiuse projector to have the capability to image transparency paper for quick note-taking and jotting, as well as image documents on multiuse white paper. In addition, an electronic pen and water-based erasable marker can be used for immediate direct imaging on the fiber optic glass. The projector also provides for the capability to copy, scan, print and fax. Personal computers or computer components can be used to access documents or picture files from the internet or internal/external hard drive to project for immediate use during the many presentation demands of a modern office. Use of the invention with a personal computer or laptop, allows for presentations, copy, scan, print and fax from the convenience of a laptop anywhere and anytime but not required as the portable multiuse projector can work independently. Moreover, the multiuse projector of the invention is supplied with USB ports to accommodate tablet or electronic books, SD external hard drive and/or mouse or other input device usage.

BRIEF DESCRIPTION OF THE FIGURES

FIG. 5 depicts the top view of the portable multiuse projector with the lid-closed view of FIG. 1, and a viewing screen incorporated into the lid.

FIG. 6a depicts the top inside view of a portable multiuse projector of FIG. 1.

FIG. 6b shows a cross-section of the fiber-optic projection glass shown in FIG. 6a.

FIG. 6c illustrates an enlargement of the multi-fibers that comprise the fiber-optic projection plate of FIG. 6b.

FIG. 7 depicts the front inside view of the portable multiuse projector of FIG. 1.

DETAILED DESCRIPTION OF THE INVENTION

Figure 1:
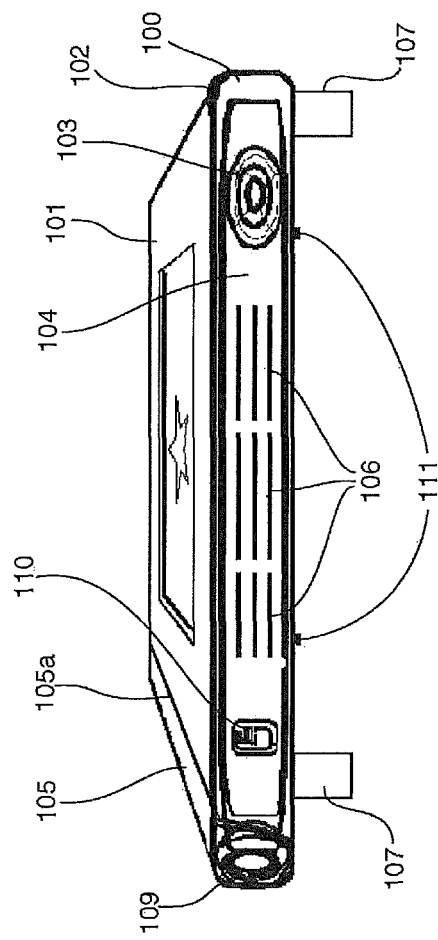
FIG. 1 depicts a front view of a portable multiuse projector, with the cover closed.

The present invention is drawn to a portable multiuse projector, which includes a fiber optic glass, where documents and other images drawn or placed on the glass, are recognized by the fiber optic projection plate, then transfer the images, pixel by pixel from one side of the fiber optic projection plate, made of multi-fiber to the other side, then transfers the image to the image remapping device to transform light or images from an input field of one size into an output field of another size sending that image through the projection lens to a projection screen or wall. Multi-fibers are building blocks of coherent fiber-optic structures, capable of transmitting positional information or images from one end to the other end. Multi-fibers may be constructed of a few hundreds of thousands of individual fibers tightly packed and fused together for total internal reflection at visible wavelengths. Such multi-fibers have been used for converting ionizing and penetrating radiation energy such as X-rays, neutrons, ions, electrons, and the like into visible light for imaging applications. See U.S. Pat. No. 5,594,253, incorporated by reference in its entirety, in particular, FIGS. 1-3, 6, and 7, col. 3, line 41-54, col. 4, lines 34-60, col. 5, line 4 and bridging over to col. 6 line 40 and U.S. Pat. No. 5,636,299, incorporated by reference in its entirety, in particular, FIGS. 1-3, 5A and 5B, 7, 7A and 7B, and 8, col. 2, line 50 and bridging over to line 7, col. 4, lines 8-20, col. 5, lines 7-55, col. 6, lines 3-49 and 52-65, and col. 7, line 26, bridging over to col. 8, line 25. The fiber-optic plate of the invention is manufactured to optimize the ability to transfer an image and maximally reduce light scatter to produce a sharp image upon projection.

The present invention is also drawn to include a roller mechanism to copy, print, fax and scan documents, which can be imaged to the image remapping device and presented through the projection lens to the projector screen or wall. The other capabilities include documents, video and other information from laptops, e-readers, tablets, hard drives, and SD cards, but not limited to these devices, to send an image to an image remapping device and presented through a projection lens to a projection screen or wall. The CPU, internal hard drive, and motherboard, built within the portable multiuse projector provides for independent performance from a laptop or personal computer to access internet, system applications downloaded to the hard drive, plug and play devices attached to the projector and projection of documents saved on the hard drive. The portable multiuse projector delivers the same functionality of a personal computer with the usage of a plug and play mouse, keyboard or with the flexibility of connecting a personal computer or laptop via an input port, allows for presentations, copying, scanning, printing and facsimile capabilities. Facsimiles can be sent and received with appropriate the cable or wireless connections to a facsimile service and the images may be displayed using the projector component. A fax modem is optionally included in the invention.

Additionally, a viewing screen is optionally provided. The control panel of the unit may be provided via a GUI interface on the screen. Alternatively, a separate control panel is provided. The GUI screen can provide control using a touch screen capability.

Moreover, the multiuse projector of the invention is supplied with USB ports to accommodate tablet or electronic book presentations, external hard drive and/or mouse and electronic pen or input device usage. Wireless and BLUETOOTH capabilities are also provided. The BLUETOOTH technology provides for connectivity to surrounding computers or devices with BLUETOOTH capabilities to assume control over the projector as presentation responsibilities change users become a need. The portable multiuse projector of the invention additionally reduces office clutter for large companies and small businesses, but increases presentation capabilities with one equipment source. The portable multiuse projector of the invention is supplied with a cooling system on the bottom to allow for increased usage by reducing overheating. All images contained in or on the media handled by the portable multiuse projector unit can be projected by the projector unit.

A portable multiuse projector of the invention is shown in FIG. 1. An outer housing unit, 100, is provided. The material for the outer housing unit 100 can be of any material known in the art, but preferably be of a lightweight material that is rigid, durable and unlikely to create a static charge. The material may be made of a plastic, metal, composite, or other appropriate material. The outer surface of the lid 101, may be made of a similar material as the outer housing unit 100, but can be made of any lightweight material that is durable, removable and unlikely to create a static charge; the outer surface of the lid 101 may also contain one or more branding labels, warning labels, artistic designs or owner identification notations. The lid 101 is attached to the housing unit 100 by a hinge or similar lid attachment means. Alternatively, a permanently-mounted paper feeding attachment can be provided. A projection lens 103 is provided, which is focusable and through which an image is projected onto a screen or flat light-colored surface. The projection lens 103 is shown protruding from front housing plate 104 projects image that may be fed through the roller mechanism 105 for viewing on a projection screen as well as imaged from the fiber-optic glass. Front vents 106 are provided to aid in cooling the unit. Vents are provided herein as being located in the front of the unit, but can be located on any side, top or bottom of the unit as desired or optimal for operation. Independently adjustable front legs 107 are present and can be adjustable by any means known in the art.

A document roller mechanism 105 is provided which allows for an image-bearing sheet 108, to be fed through a paper feed slot 105a to the roller mechanism for scanning, copying, faxing and printing. The embodiment shown in FIG. 1 depicts a distal end 109, of the document roller mechanism 105, which distal end attaches to the outer housing unit 100. The front housing plate 104 contains fenestrae through which the fiber-optic projection adjustor 110, front vents 106, and projector lens 103, protrude. The fiber-optic projection adjustor 110 is used to adjust the contrast during projections. A means to mechanically focus the image or to electronically focus the image is also provided. A set of rear leg stands 111, or support means, are also included and are optionally-adjustable. Both sets of legs 107 and 108 are foldable or otherwise stowable to storage or transport.

Figure 2:
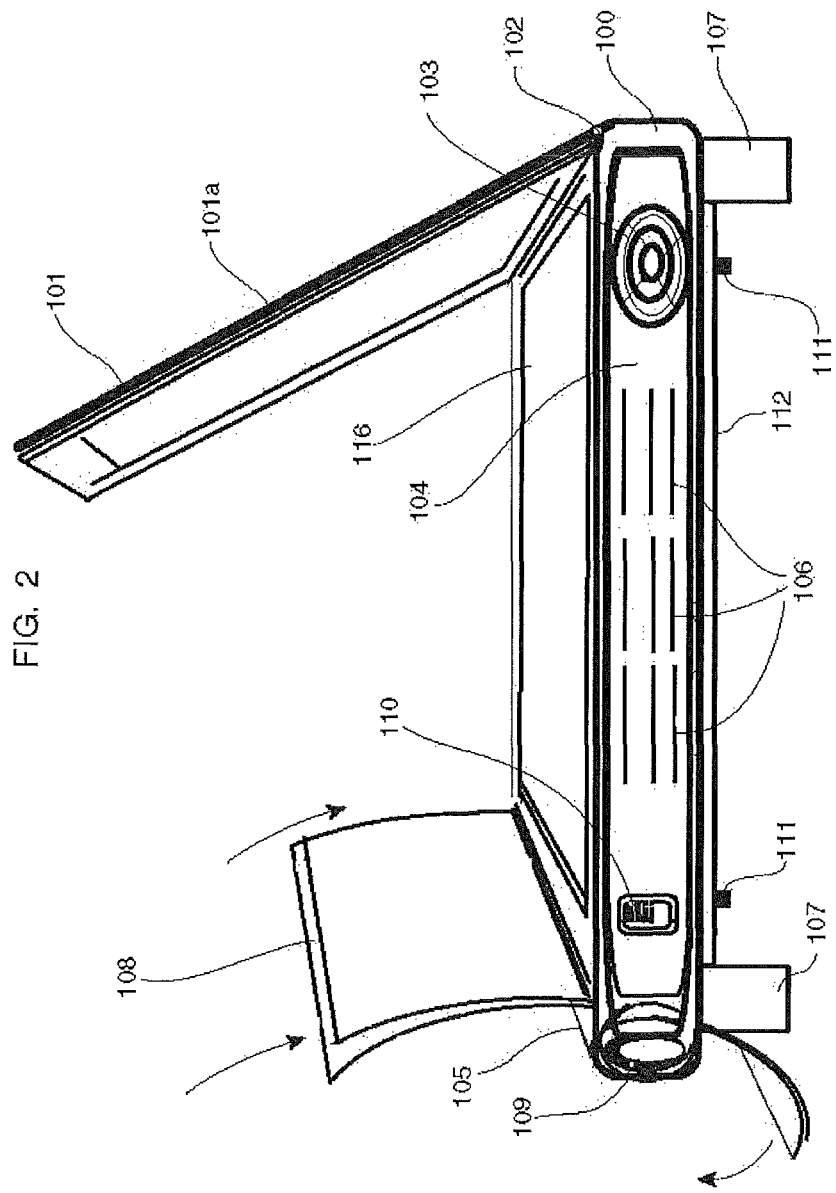
FIG. 2 shows the front view of the portable multiuse projector of FIG. 1, with the cover raised and a paper travelling through the rollers of the copy/scan/print/fax apparatus.

FIG. 2 displays the unit with the lid 101 raised, with sheet 108 and image 108a, feeding through the rollers mechanism 105, from the top to the bottom of the unit. The outer surface lid 101 is attached to or fused to the lid member 101a, which is hingeably attached 102 to the outer housing unit 100 by any means known in the art. A cooling system is provided, 112, to protect the hard drive, 113, CPU, 114, and motherboard, 115, as shown in FIG. 7. The inner surface of the lid 101 is made of a static free material to protect the platen glass and includes an optional shock-absorbing material such as foam or cloth. Documents can be alternatively placed on the fiber-optic projection glass 116, and other images can be drawn with an electronic pen or water-based color markers onto the glass. Data may also be transmitted to the unit via input devices, including, but not limited to a keyboard, image scanner, microphone, or pointing device. A pointing device includes, but is not limited to: a graphics tablet, joystick, light pen, mouse, trackball, pointing stick, touchpad, or touchscreen, either alone or in combination. Any input device may be integrated into the unit or external and connected to the unit via a port, such as USB 121, or the like.

Figure 3:
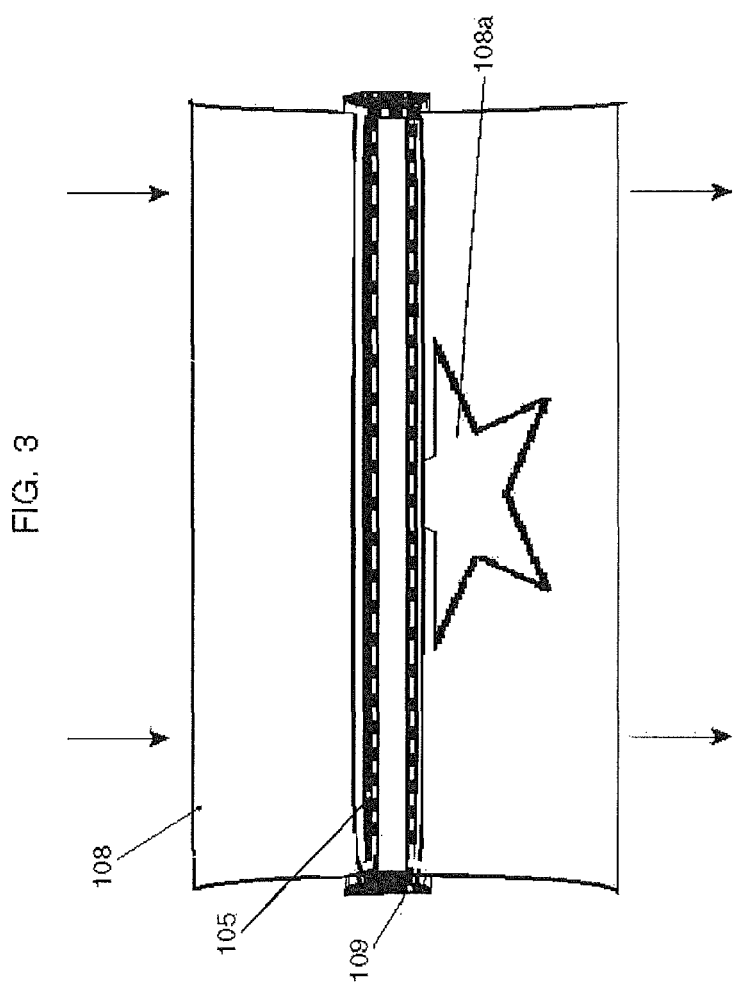
FIG. 3 depicts a right side view of the portable multiuse projector of FIG. 2, and showing a paper bearing an image travelling through the rollers of the copy/scan/print/fax apparatus.

FIG. 3 shows a right side view of an embodiment of the invention with an image-bearing sheet 108 and image 108a feeding through the rollers mechanism 105, from top to bottom. Without being limited, the sheet-feeding mechanism could be located through the lid 101, of the unit or single sheets can be imaged by which can also image documents, pictures, including film negatives, direct inscription from erasable water-based color markers on to the fiber-optic projection glass 116, as well as read electronic pen images placement on to the fiber-optic glass.

Figure 4:
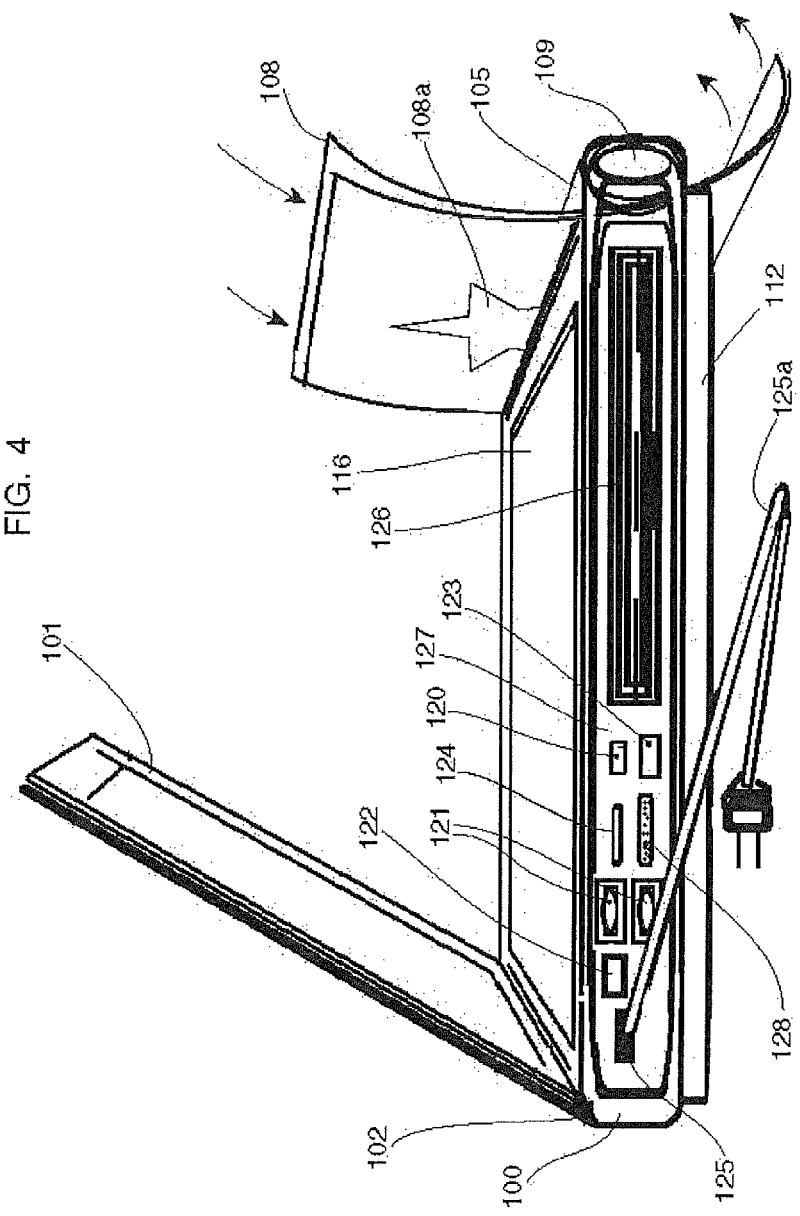
FIG. 4 depicts the back view of the portable multiuse projector of FIG. 1, with the lid raised and showing a paper bearing an image travelling through the rollers of the copy/scan/print/fax apparatus.

FIG. 4 provides a back view of the portable projector unit of the invention. At least one USB or similar port, 121, is present, as well as a laptop or workstation computer port 122, or other devices to be directly plugged into the unit. FIG. 3 also shows an image-bearing sheet 108, and an image 108a travelling through the roller mechanism 105 of the copy/scan/print/fax apparatus. To create a copy of an image, documents to be copied are fed through the roller mechanism 105 once to capture an image and again with blank paper to transfer the image. Alternatively, documents can be scanned directly from a position on the glass platen 116. A telephony/fiber-optic port 120 for facsimile and an Ethernet port 123 for internet access are also shown. An SD card slot 124 to use with SD cards that can hold pictures and other documents, a USB port 121 to attach an electronic tablet, electronic books, electronic pen and mouse 135, along with a cable port for laptop connections are also provided. An electrical cord 125a, is provided that can be optionally removable 125, as well as a rechargeable battery 126 and access to the battery unit is given through the rear housing plate, 127. A printer cable port 128 may be exterior to the portable multiuse projector unit or positioned within the unit housing case 101, may be positioned at the bottom of the portable multiuse projector unit as shown, or located in any configuration as deemed desirable or for optimum operation. The unit may be air-cooled or fluid-cooled, or be manufactured from a heat-sink material. Fans are provided in air-cooled units and optionally in combinations with other cooling systems. The portable multiuse projector shows versatility that allows the ability to project multiple types of documents, but also possesses the functionality of a personal computer because of the presence of the built-in CPU 114, hard drive 113, and motherboard 115.

A top view of the unit is shown in FIG. 5. A display screen 129 is optionally included. The screen can be incorporated into the lid 101 as shown or in any other location deeded desirable during manufacture. A separate display monitor may also be connected and used. Internal components of the unit of the invention are shown in FIG. 6, showing the fiber-optic plate 117. Documents placed on the platen, or herein, the fiber-optic projection glass 116, are imaged through a fiber-optic plate 117, which transfers an image 108a pixel by pixel through its multi-fibers 118, from one side of the plate to the other side. The image is then transferred to the remapping device 119 which is a structure of fused fibers that transforms light or images 108a from an input field of one size into an output field of another size. The size and conformation of the remapping device is usually application-specific and custom in nature, and therefore the invention encompasses the size and conformation required for any particular model or modification of the projector of the invention. A cross section of the fiber-optic projection plate 117 is shown in inset FIG. 6b, wherein the projection glass 116 overlays the plate 117. Inset FIG. 6c shows an enlargement of the cross section of FIG. 6b, and the multi-fibers 118 of which it is composed. The image remapping device 119 also sends the image to the telephony/fiber-optic port 120, shown in FIG. 4, for facsimiles. The image remapping device 119 is shown in greater detail in FIG. 6d. Optionally, the signal can be transmitted via Wi-Fi.

FIG. 7 depicts the front inside view of the portable multiuse projector of FIG. 1, showing the rechargeable battery 126, which will allow for the multiuse projector to be used in multiple places without the need for an electrical outlet. The user can use a GUI interface to locate the drive to access external hard drives and devices as well as access the internal hard drive 113, CPU 114, and motherboard 115, as shown in FIG. 7, which allows the projection of documents to a projection screen. The image is transferred to a fiber-optic projection platen glass 116, and fiber-optic plate 117, which transfers the image 108a from a first side of the plate to a second side of the plate, through the multi-fibers 118, before transferring to the image remapping device 119, to be routed through the projection lens 103. A rechargeable battery, 126, is included, which is useful for a traveling person who is away from a readily available electrical outlet and for the mobile user needing the flexibility to perform presentations anywhere. Also a telephony/fiber-optic port 117, allows for fiber-optic usage, such as cable service fed to the image remapping device 119, to project motion picture. There is also an Ethernet port 123, for Internet access and a printer cable port 128, for printing documents fed through the roller mechanism 105, along with an SD card slot 124, for storage of documents, pictures or videos. The CPU 114, hard drive 113, and motherboard 115, provided uses software technology to record the documents that pass through the various ports to be stored and/or manipulated at a later time. The internal components can support BLUETOOTH connectivity to various laptops to allow wireless control of the multiuse projector. The hard drive stores and the CPU 114 runs useful commercially-available and access to websites to access and present needed information from the world-wide-web for projection, copies or fax transmission.

Figure 8:
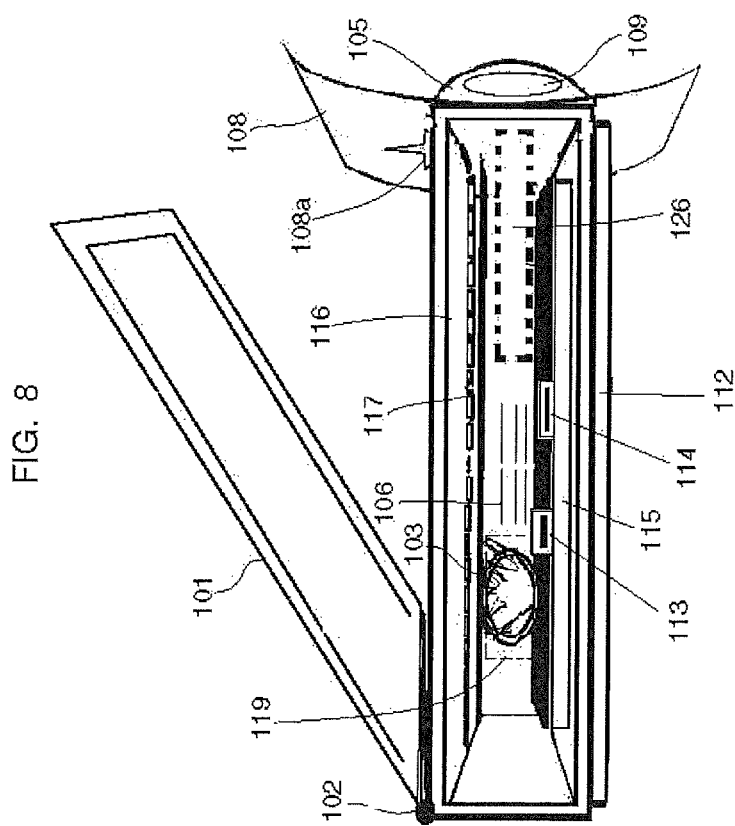
FIG. 8 depicts the back inside view of the portable multiuse projector of FIG. 1.

FIG. 8 depicts the back inside view of the portable multiuse projector of FIG. 1, shows the fiber-optic projection glass 116, where documents are placed and the image 108a of the document is transferred from the fiber-optic plate 117, to the image remapping device 119, and through the projection lens 103, to the projection screen. The images can be saved to the internal hard drive 113, for later use, saved to an external hard drive, or saved to a Cloud computing web application.

Figure 9:
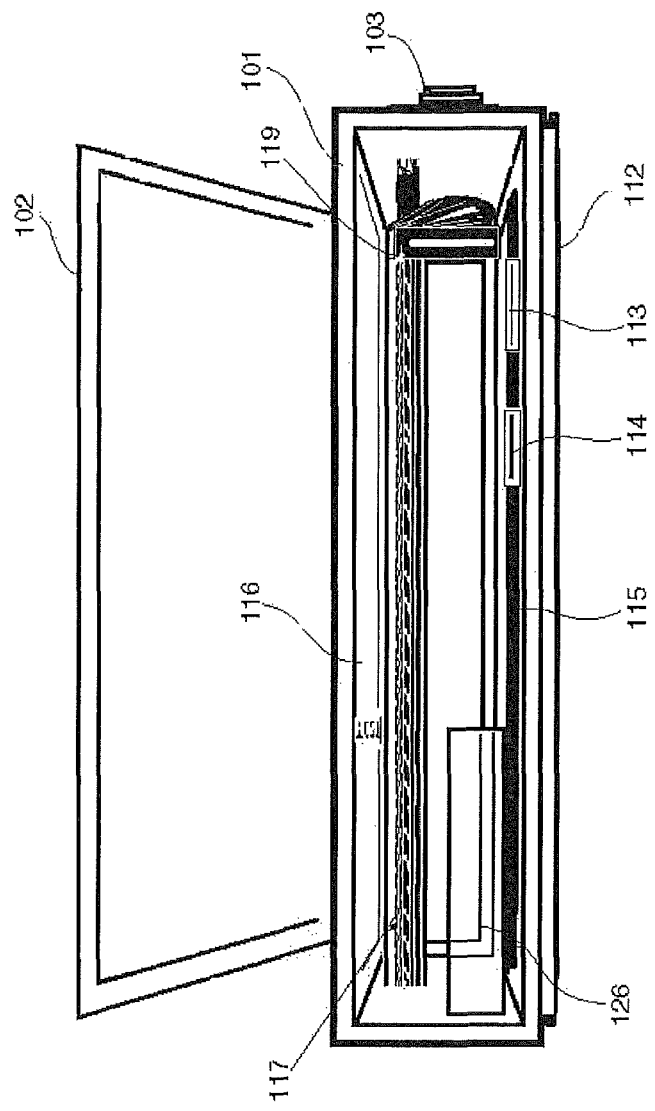
FIG. 9 depicts the right inside view of the portable multiuse projector of FIG. 1 and the lid open.

FIG. 9 depicts the right inside view of the portable multiuse projector of FIG. 1, with the roller apparatus 105 and housing 100 removed and shows the rechargeable battery 126. FIG. 9 also shows the CPU 114, hard drive 113, and motherboard 115. The heat from running the projector uses the cooling system 112, to reduce overheating of the CPU 114, internal hard drive 113, and motherboard 115, and other projector components while releasing the heat through the front vents 106. Fans are optionally provided to assist in cooling the unit and to facilitate moving hot air through the vents 106.

Figure 10:
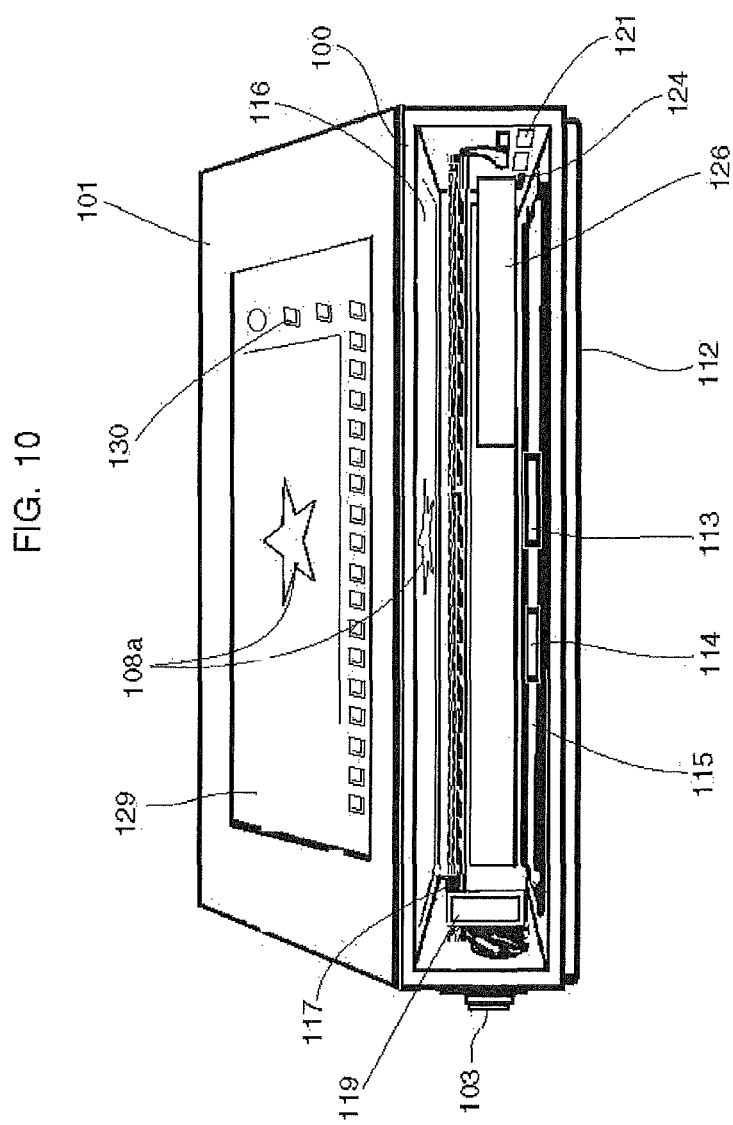
FIG. 10 depicts the left inside view of the portable multiuse projector of FIG. 1 and a partially-raised lid with an included display screen.

FIG. 10 depicts the left inside view of the portable multiuse projector of FIG. 1, showing the rechargeable battery 126, and the hingeably-connected lid partially-open fiber-optic plate 117. FIG. 10 also illustrates the image 108a simultaneously shown on the display screen 129 and present on the glass platen 116, overlaying the fiber-optic plate 117.

Figure 11:
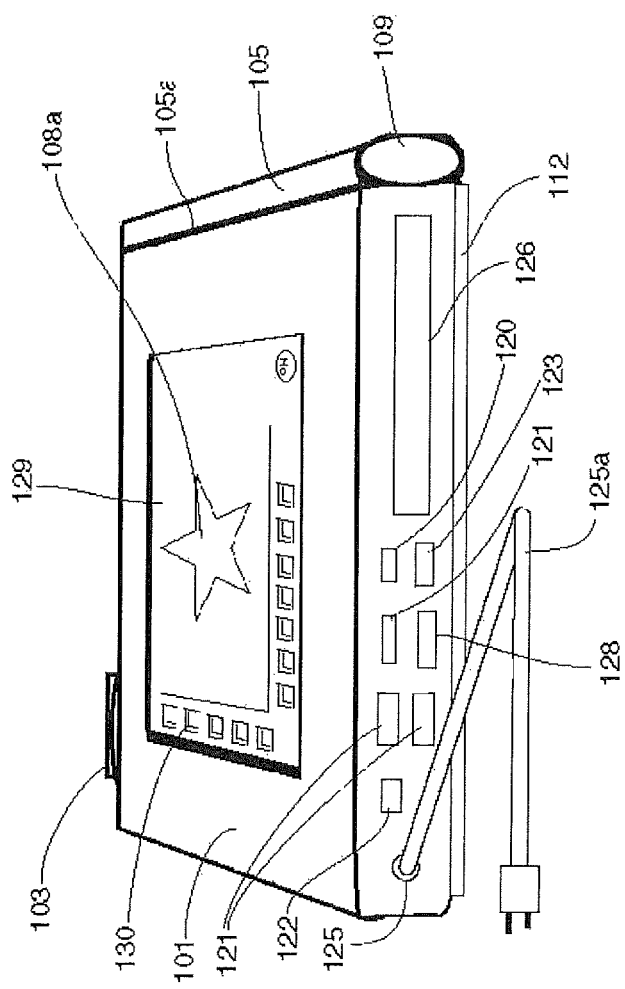
FIG. 11 is a rear perspective view of the portable multi-use projector of the invention with the lid closed and illustrating the display screen with GUI interface and controls incorporated into the lid.

FIG. 11 depicts an embodiment of the viewing screen 129 displaying an image 108a. The projector of the invention can be used to image transparency paper, written and printed documents, electronic pen used directly on the projection glass 116, and direct water-based erasable marker inscription onto the fiber-optic projection glass 116 for projection onto a screen or wall 108b. In addition, the USB or similar port 121 provides for the use of an electronic pen, INTELLI-MOUSE, external hard drives and other components, or combinations thereof, that use USB plug-and-play to work with the multiuse projector.

Figure 12:
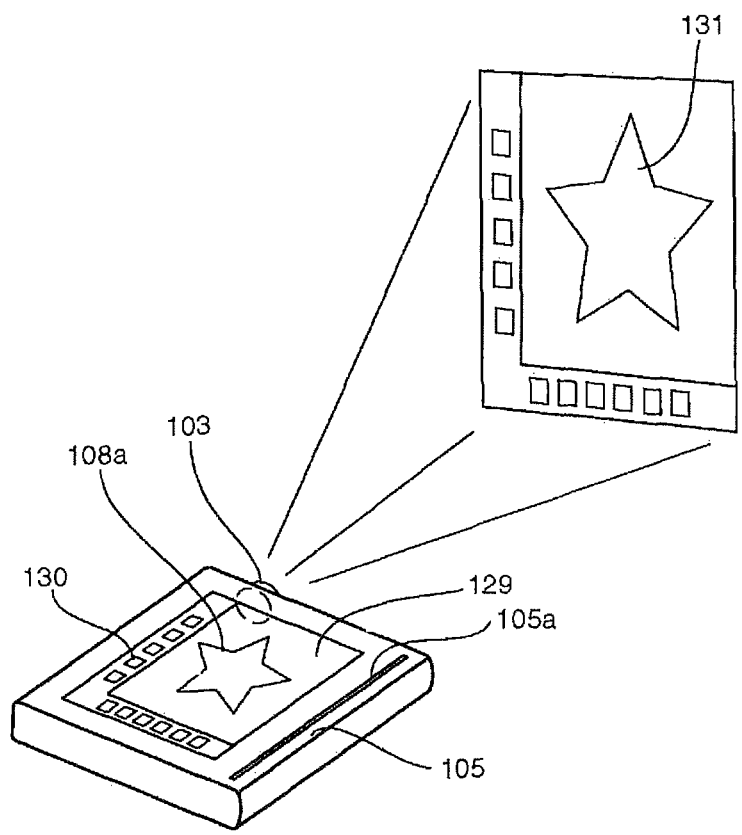
FIG. 12 illustrates the projection of an image using the portable multiuse projector of the invention.

FIG. 12 depicts the projector of the invention in use. The projector uses the viewing screen to access a GUI interface 130 to access applications and also optionally to unit display control buttons. These applications are stored on the internal hard drive 113, included in the invention. Said viewing screen can either be integrally part of the unit, or a separate screen provided by a laptop computer or a stand-alone screen.

It is understood that slots and ports, such as, but not limited to, an SD slot 124, telephony/fiber-optic port 120, Ethernet port 123, US port 121 and the like can be located in any advantageous position on the machine for ergonomic or manufacturing reasons and are shown as one of several possible embodiments. Additionally, any internal components, such as, but not limited to an internal battery 126, CPU and the like are likewise located in any position that is advantageous for ergonomic or manufacturing reasons.

Figure 13:
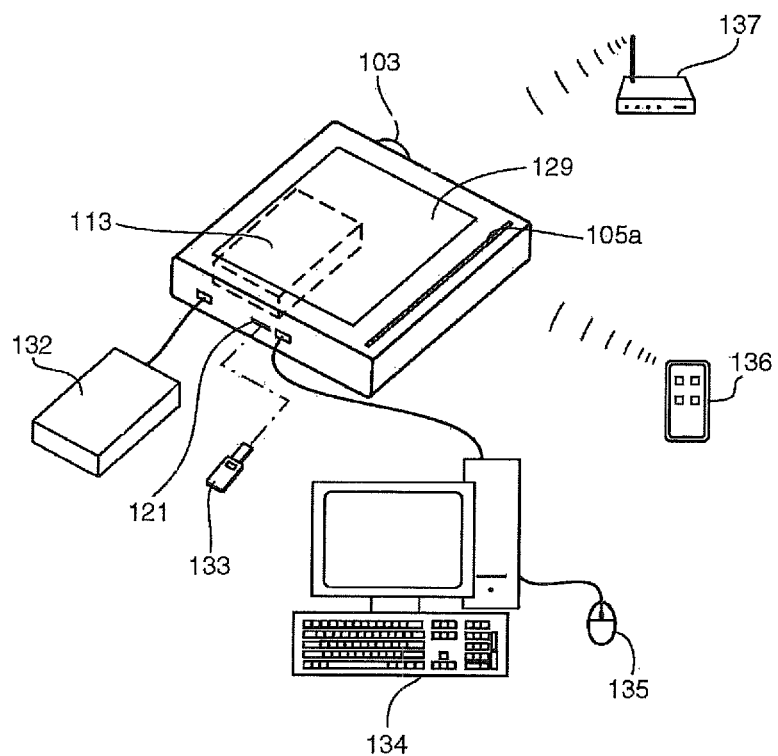
FIG. 13 demonstrates interactions of computer peripherals and other computerized systems with the multi-use projector of the invention.

FIG. 13 demonstrates the interactions that the multi-use projector of the invention has with various computer peripheral devices and other external appliances and computing devices. An internal 113 or external 132 hard drive can be used to store data. Data storage devices such as flash drives 133, flash cards, SD cards or other data storage devices. Other computers or workstations 134 or laptops can also interact with the projector, as can tablets, handheld computer devices or smartphones 136. Mouse or trackball pointing devices or the like 135 can be connected to control various functions or for use in pointing and clicking various commands on the unit. The unit of the invention can also be connected to the internet via a router 137, through Wi-Fi or direct wired connection.

Having now fully described this invention, it will be understood to those of ordinary skill in the art that the same can be performed within a wide and equivalent range of conditions, arrangements, and other parameters without affecting the scope of the invention or any embodiment thereof. All patents and publications cited herein are incorporated by reference in their entirety.

I claim:

1. A portable multiuse projector, which comprises:
    a fiber optic projection platen glass;
    a fiber optic projection plate, wherein the fiber-optic projection platen glass overlays the fiber-optic projection plate;
    an image remapping device;
    computer components comprising a CPU, internal hard drive, and motherboard, power supply, cooling fans, video card, Wi-Fi card, and network card;
    a paper feeding apparatus comprising a roller mechanism; and
    a projection system comprising:
        a light source device,
        a housing,
        an optical element that transmits light projected onto a display surface outside of the housing,
        a control unit that adjusts the amount of light transmitted through the projection system;
        mirrors; and
        a focusing mechanism;
    and wherein an image is drawn or placed on the fiber optic projection platen glass is projected onto a wall or projection screen by a method comprising;
        conveying the image to the fiber optic projection plate,
        transferring the image pixel by pixel from one side of the fiber optic projection plate, to the opposite side, and
        transferring the image to an image remapping device to transform light or images from an input field of one size into an output field of another size, and
        sending the image through the projection lens to a display surface, or printing a copy of the image, or display on a flat panel screen.

2. The portable multiuse projector of claim 1, wherein the image is supplied to the projector by scanning documents using the paper feeding apparatus, drawn onto an image input apparatus, provided via computer readable storage devices or via an internet connection, video, e-readers, tablets, hard drives, thumb drives, or SD cards.

3. The portable multiuse projector of claim 1, wherein the CPU, internal hard drive, and motherboard, integrated within the portable multiuse projector allows independent computer to access to the internet, system applications downloaded to the hard drive, plug and play devices attached to the projector and projection of documents saved on the hard drive.

4. The portable multiuse projector of claim 3, wherein a mouse and keyboard are attached to the portable multiuse projector.

5. The portable multiuse projector of claim 3, wherein a personal computer, laptop or tablet computing device is attached.

6. The portable multiuse projector of claim 1 wherein facsimiles can be sent and received with cable or wireless connections to a facsimile service and the images may be displayed using the projector component.

7. The portable multiuse projector of claim 6, wherein a fax modem is included with in the housing.

8. The portable multiuse projector of claim 1, wherein a viewing screen is integrated into the housing unit.

9. The portable multiuse projector of claim 1 wherein input is transmitted to the projector via an input device.

10. The portable multiuse projector of claim 9 wherein the input device is selected from the group consisting of: a graphics tablet, joystick, light pen, mouse, trackball, electronic pen, pointing stick, touchpad, and touchscreen.

* * * * *